(12) United States Patent
Abe et al.

(10) Patent No.: US 7,506,710 B2
(45) Date of Patent: Mar. 24, 2009

(54) HYBRID VEHICLE

(75) Inventors: Noriyuki Abe, Saitama (JP); Hideo Kimura, Saitama (JP); Masayuki Fuchino, Saitama (JP); Tetsuya Hasebe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 80 days.

(21) Appl. No.: 10/567,434

(22) PCT Filed: Aug. 13, 2004

(86) PCT No.: PCT/JP2004/011692

§ 371 (c)(1),
(2), (4) Date: Nov. 28, 2006

(87) PCT Pub. No.: WO2005/028234

PCT Pub. Date: Mar. 31, 2005

(65) Prior Publication Data

US 2007/0163823 A1    Jul. 19, 2007

(30) Foreign Application Priority Data

Aug. 18, 2003    (JP) ............................. 2003-294662

(51) Int. Cl.
    *B60K 1/00*    (2006.01)
    *B60K 6/00*    (2007.10)
(52) U.S. Cl. ...................... 180/65.2; 180/65.6; 903/906
(58) Field of Classification Search ................ 180/65.2, 180/65.3, 65.4, 65.6, 65.8; 903/903, 905, 903/906, 910; 477/3, 5
See application file for complete search history.

(56) References Cited

U.S. PATENT DOCUMENTS 5,513,719 A * 5/1996 Moroto et al. ............. 180/65.4

(Continued)

FOREIGN PATENT DOCUMENTS

JP    11-180173    7/1999

(Continued)

OTHER PUBLICATIONS

International Search Report, dated Sep. 14, 2004 of PCT/JP2004/011692.

*Primary Examiner*—Hau V Phan
(74) *Attorney, Agent, or Firm*—Westerman, Hattori, Daniels & Adrian, LLP.

(57) ABSTRACT

A hybrid vehicle is provided in which, since the driving force of a generator/motor (M1) disposed so as to surround the outer periphery of an input shaft (16) of a transmission (T) is transmitted to an output shaft (17) of the transmission (T) via an endless chain (78), it is possible to carry out the so-called leg shaft drive, in which transmission of the driving force between the generator/motor (M1) and the output shaft (17) is carried out without going through an engine (E) and the input shaft (16), thus reducing power consumption and enhancing energy recovery efficiency during regenerative braking. Furthermore, since a crankshaft (15) of the engine (E) and the input shaft (16) of the transmission (T) are disposed coaxially, and the generator/motor (M1) is disposed at a position sandwiched between the engine (E) and the transmission (T), it is possible to employ the same layout for the generator/motor (M1) as for a conventional sandwiched generator/motor, and the leg shaft drive system can be employed without greatly modifying the design of the transmission (T).

3 Claims, 10 Drawing Sheets

U.S. PATENT DOCUMENTS

| | | | |
|---|---|---|---|
| 5,571,058 A * | 11/1996 | Schmidt | 475/5 |
| 5,697,466 A * | 12/1997 | Moroto et al. | 180/65.2 |
| 6,146,302 A * | 11/2000 | Kashiwase | 475/5 |
| 6,155,364 A * | 12/2000 | Nagano et al. | 180/65.2 |
| 6,203,468 B1 * | 3/2001 | Nitta et al. | 477/5 |
| 6,455,947 B1 * | 9/2002 | Lilley et al. | 180/65.6 |
| 6,554,736 B2 * | 4/2003 | Takano et al. | 477/5 |
| 7,081,060 B2 * | 7/2006 | Hata et al. | 475/5 |
| 7,110,869 B2 * | 9/2006 | Tao et al. | 701/34 |
| 7,191,859 B2 * | 3/2007 | Hashimoto | 180/65.4 |
| 7,223,200 B2 * | 5/2007 | Kojima et al. | 477/3 |
| 7,255,186 B2 * | 8/2007 | Wakuta et al. | 180/65.2 |

FOREIGN PATENT DOCUMENTS

| | | |
|---|---|---|
| JP | 11-198668 | 7/1999 |
| JP | 2000-97070 | 4/2000 |
| JP | 2000-261906 | 9/2000 |
| JP | 2002-188716 | 7/2002 |
| JP | 2002-211250 | 7/2002 |

* cited by examiner

HYBRID VEHICLE

TECHNICAL FIELD

The present invention relates to a hybrid vehicle that can travel by means of either one or both of the driving force of an engine and the driving force of a generator/motor.

BACKGROUND ART

In such a hybrid vehicle, the layout for an engine, a generator/motor, and a transmission that is conventionally employed is in general of a so-called sandwiched generator/motor type in which a thin generator/motor is sandwiched between the engine and the transmission. In the layout of the sandwiched generator/motor type, since the generator/motor is joined to a crankshaft of the engine and an input shaft of the transmission and always rotates integrally therewith, when the generator/motor carries out regenerative braking during deceleration of the vehicle, there are the problems that friction in the engine and the transmission might degrade the energy recovery efficiency, and the friction of the engine is a load on the generator/motor when traveling by means of the generator/motor, thus increasing the power consumption.

A so-called leg shaft drive system hybrid vehicle is known from, for example, Patent Publication 1 below in which the above-mentioned problems have been solved by enabling a generator/motor to be isolated from a crankshaft of an engine and an input shaft of a transmission, and enabling the driving force of the generator/motor to be transmitted to a driven wheel side rather than an output shaft of the transmission.

In this hybrid vehicle, the generator/motor is connected in series via a clutch to an end of the input shaft of the transmission on the side opposite to the engine, and by isolating the generator/motor from the input shaft of the transmission and the crankshaft of the engine by disengaging the clutch, the driving force of the generator/motor can be transmitted directly to the output shaft of the transmission.

DISCLOSURE OF THE INVENTION

Problems to be Solved by the Invention

However, in the arrangement disclosed in Patent Publication 1 above, since the engine and the generator/motor are disposed at axially opposite ends of the input shaft of the transmission, a sandwiched generator/motor type transmission cannot be used as it is, and there is the problem that, in order to employ the leg shaft drive system, it is necessary to greatly modify the design of the transmission.

The present invention has been accomplished under the above-mentioned circumstances, and it is an object thereof to provide a hybrid vehicle that can employ the leg shaft drive system without subjecting a sandwiched generator/motor type transmission to large-scale design modification.

Means for Solving the Problems

In order to accomplish the above object, according to a first aspect of the present invention, there is proposed a hybrid vehicle comprising: an engine having a crankshaft; a transmission that has an input shaft joined coaxially to the crankshaft and an output shaft disposed in parallel to the input shaft, and is capable of changing the gear ratio between the input shaft and the output shaft; a generator/motor that is disposed so as to surround the outer periphery of an axis of the input shaft at a position sandwiched between the engine and the transmission; and power transmission means for transmitting the driving force of the generator/motor to any position of a power transmission pathway between the output shaft and a differential gear; the vehicle being capable of traveling by means of either one or both of the driving force of the engine and the driving force of the generator/motor.

According to a second aspect of the present invention, in addition to the first aspect, the generator/motor is disposed coaxially with the axis.

According to a third aspect of the present invention, in addition to the first or second aspect, a starter motor is joined to an end part of the input shaft on a side opposite to the engine.

According to a fourth aspect of the present invention, in addition to the first or second aspect, a starter motor disposed so as to surround the outer periphery of the axis at a position sandwiched between the engine and the transmission is joined to the crankshaft or the input shaft.

An endless chain 78 of embodiments correspond to the power transmission means of the present invention.

Effects of the Invention

In accordance with the first aspect, since the driving force of the generator/motor, which is disposed so as to surround the outer periphery of the axis of the input shaft of the transmission, is transmitted to any position of the power transmission pathway between the output shaft of the transmission and the differential gear via the power transmission means, it is possible to carry out leg shaft drive in which transmission of the driving force between the generator/motor and the differential gear is carried out without going through the engine and the input shaft, power consumption can be reduced due to a decrease in friction, and the energy recovery efficiency during regenerative braking can be improved. Furthermore, since the crankshaft of the engine and the input shaft of the transmission are disposed coaxially, and the generator/motor is disposed at a position sandwiched between the engine and the transmission, the generator/motor can be arranged in the same manner as for a conventional sandwiched generator/motor type, and not only can the leg shaft drive system be employed without greatly modifying the design of the sandwiched generator/motor type transmission, but also the axial dimension does not increase compared with the sandwiched generator/motor type transmission.

In accordance with the second aspect, since the generator/motor is disposed coaxially with the axis of the input shaft, it is possible to easily avoid interference between the generator/motor and the input shaft.

In accordance with the third aspect, since the starter motor is joined to the end part of the input shaft on the side opposite to the engine side, the engine can be started by means of a compact structure, and power can be generated by driving the starter motor by means of the engine.

In accordance with the fourth aspect, since the starter motor disposed so as to surround the axis of the input shaft at a position sandwiched between the engine and the transmission is joined to the crankshaft or the input shaft, the engine can be started by means of a compact structure, and power can be generated by driving the starter motor by means of the engine.

BRIEF EXPLANATION OF DRAWINGS

FIG. 1 is a vertical sectional view of a power unit of a hybrid vehicle related to a first embodiment (Embodiment 1).

FIG. 2 is an enlarged view of part A in FIG. 1 (Embodiment 1).

FIG. 3 is an enlarged view of part B in FIG. 1 (Embodiment 1).

FIG. 4 is an enlarged view of part C in FIG. 1 (Embodiment 1).

FIG. 5 is a view from arrowed line 5-5 in FIG. 1 (Embodiment 1).

FIG. 6 is an enlarged view of a forward/reverse travel switching mechanism (Embodiment 1).

FIG. 7 is a vertical sectional view of a power unit of a hybrid vehicle related to a second embodiment (Embodiment 2).

FIG. 8 is an enlarged view of an essential part in FIG. 7 (Embodiment 2).

FIG. 9 is a skeleton diagram of a power unit of a hybrid vehicle related to a third embodiment (Embodiment 2).

FIG. 10 is a skeleton diagram of a power unit of a hybrid vehicle related to a fourth embodiment (Embodiment 2).

EXPLANATION OF REFERENCE NUMERALS AND SYMBOLS

15 Crankshaft
16 Input Shaft
17 Output Shaft
19 Differential Gear
78 Endless Chain (Power Transmission Means)
E Engine
L Axis of Input Shaft
M1 Generator/Motor
M2 Starter Motor
T Transmission

BEST MODE FOR CARRYING OUT THE INVENTION

Modes for carrying out the present invention are explained below by reference to embodiments of the present invention shown in the attached drawings.

Embodiment 1

FIG. 1 to FIG. 6 show a first embodiment of the present invention.

Figure 1:
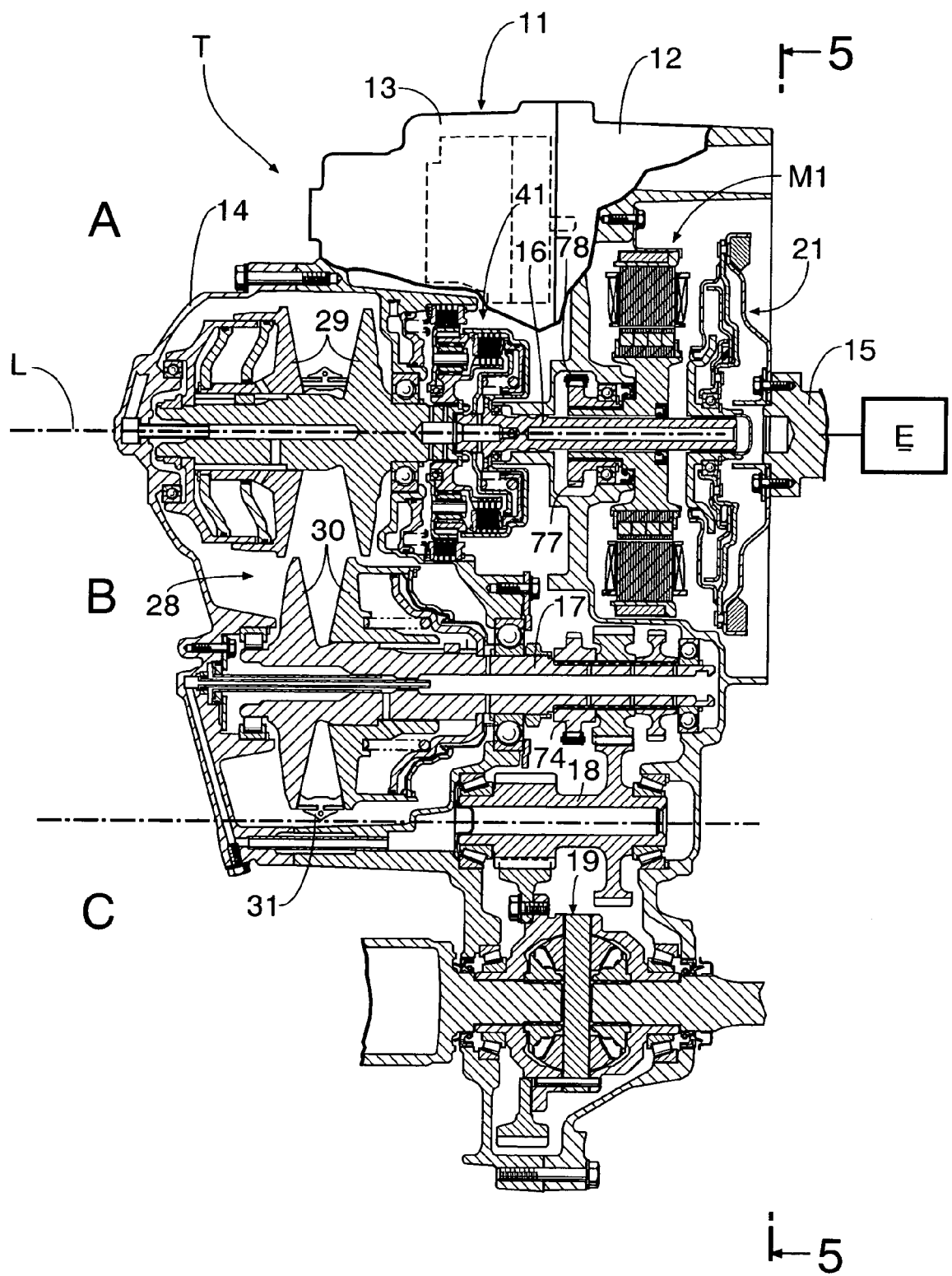
[FIG. 1]

As shown in FIG. 1, a transmission case 11 of a transmission T mounted in a front part of a vehicle body of a front-engined/front wheel drive vehicle is divided into a right casing 12, a middle casing 13, and a left casing 14. A shaft end of a crankshaft 15 of an engine E faces an opening at the right-hand end of the right casing 12, and an input shaft 16 (main shaft) of the transmission T, which shares an axis L with the crankshaft 15, is supported in the interior of the transmission case 11. Furthermore, supported within the transmission case 11 are an output shaft 17 (counter shaft) and a reduction shaft 18, which are parallel to the input shaft 16, and disposed beneath the reduction shaft 18 is a differential gear 19.

Figure 5:
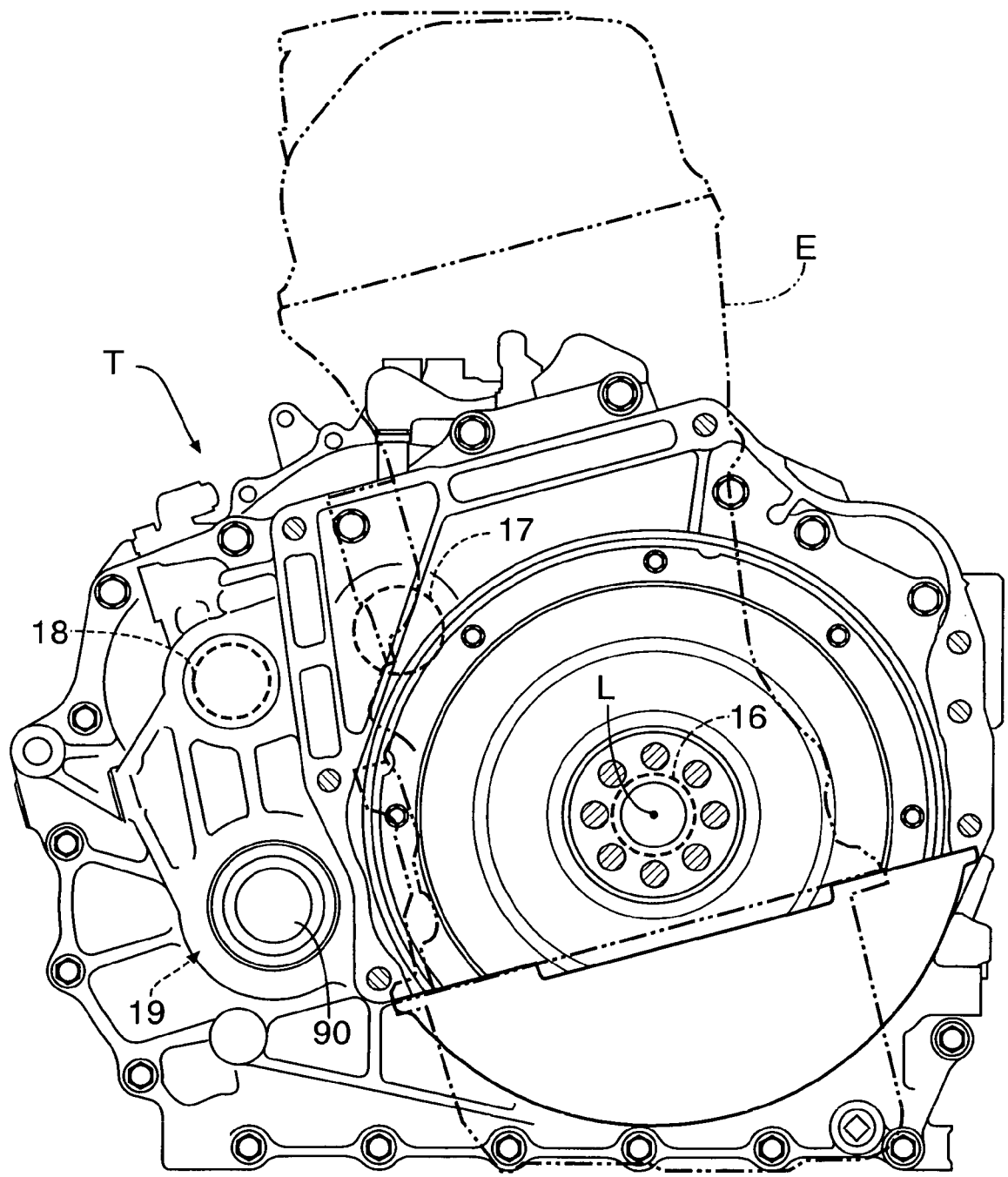
[FIG. 5]
Figure 6:
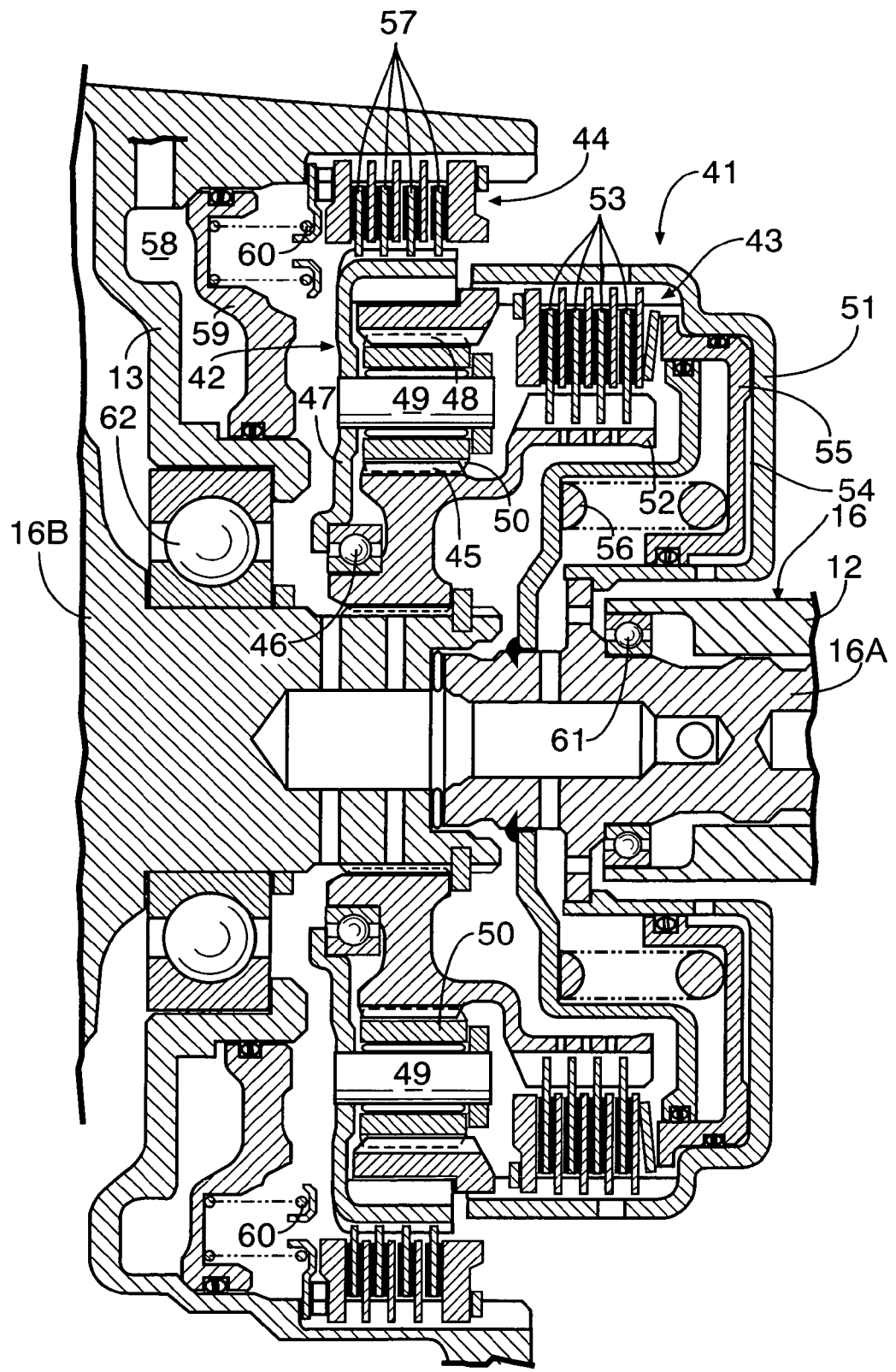
[FIG. 6]

As is clear from FIG. 5, the output shaft 17 is disposed above and behind the crankshaft 15 and the input shaft 16, which are disposed on the axis L, the reduction shaft 18 is disposed behind the output shaft 17, and the differential gear 19 is disposed beneath the reduction shaft 18.

Figure 2:
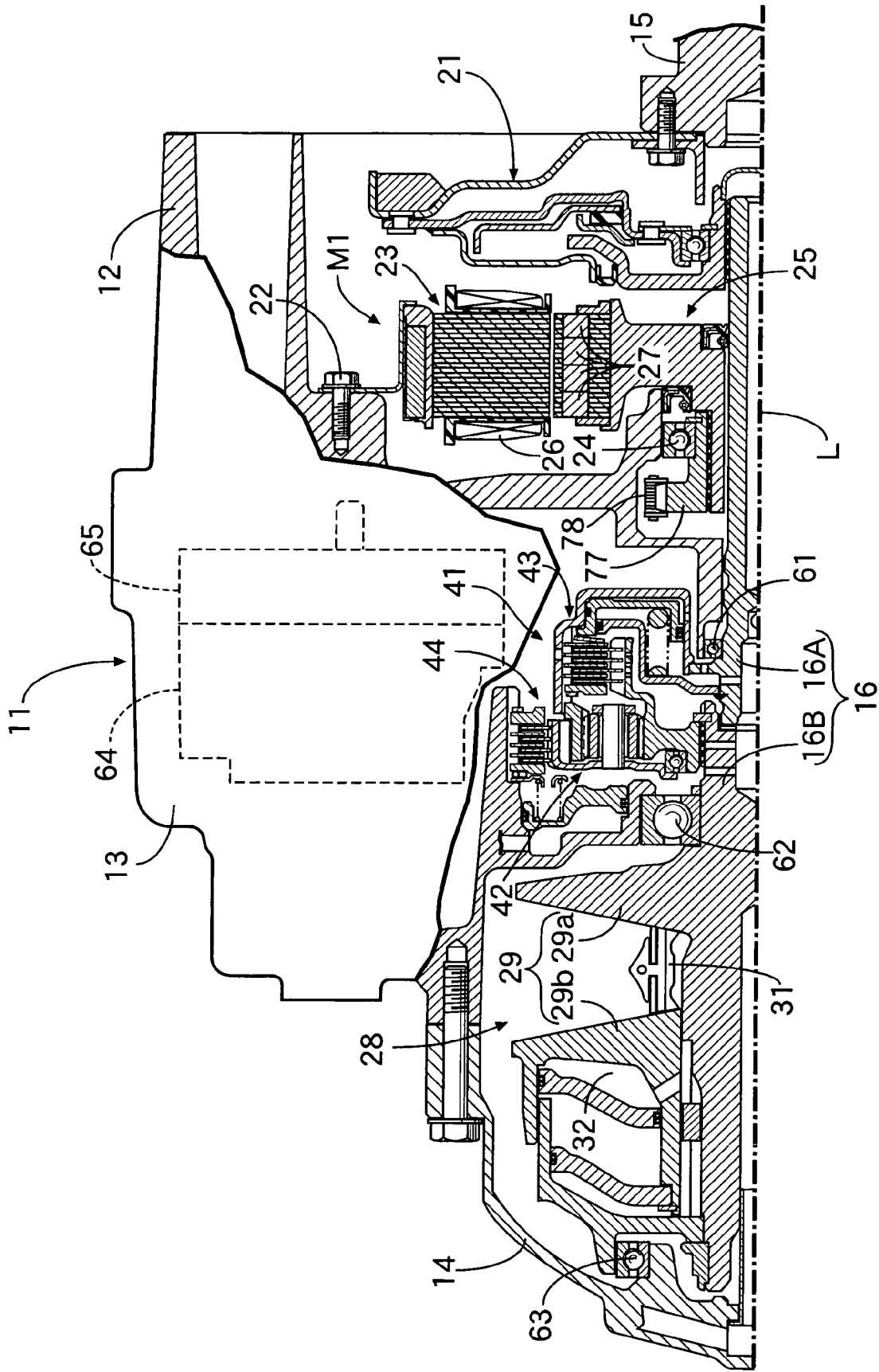
[FIG. 2]
Figure 3:
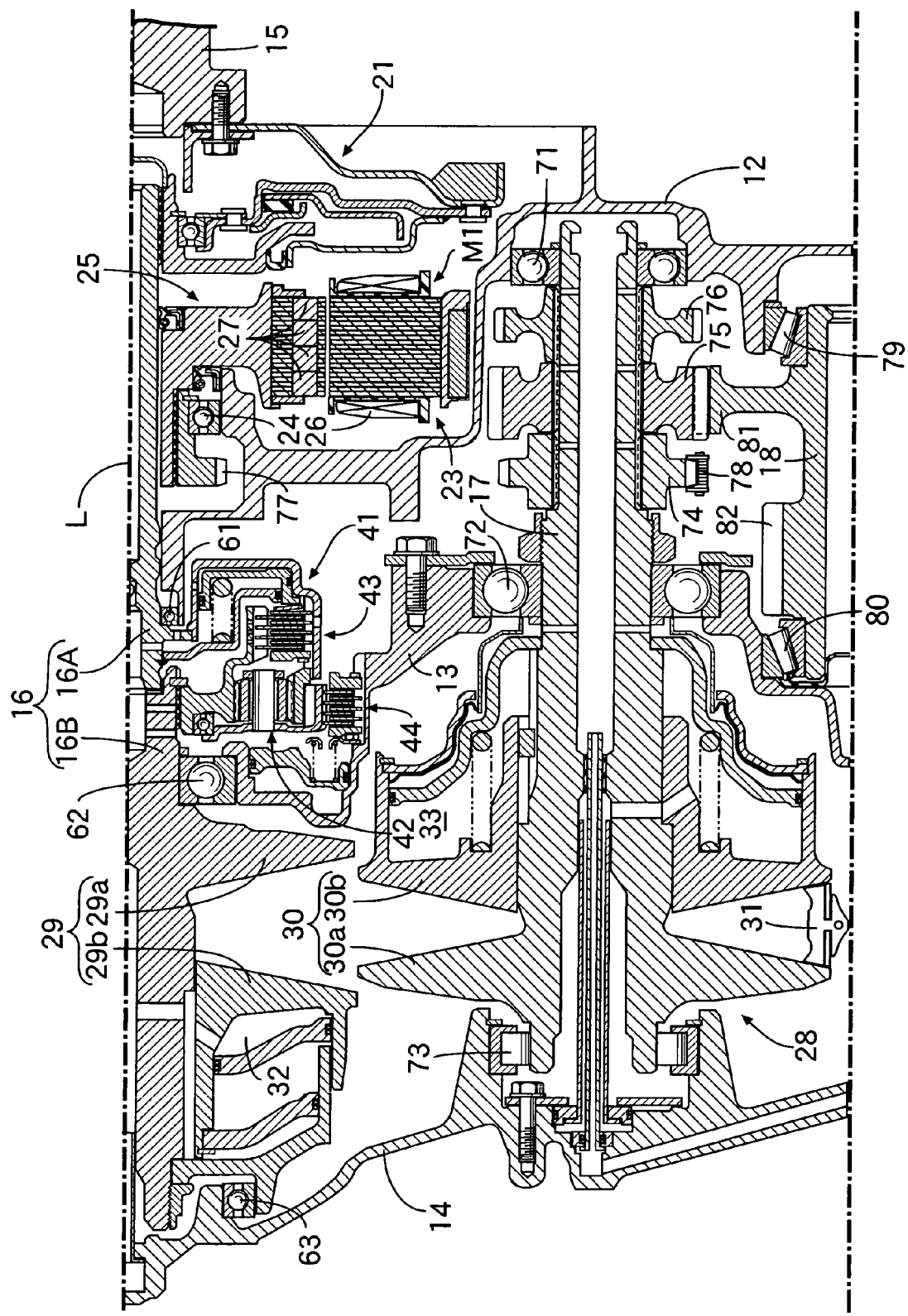
[FIG. 3]
Figure 4:
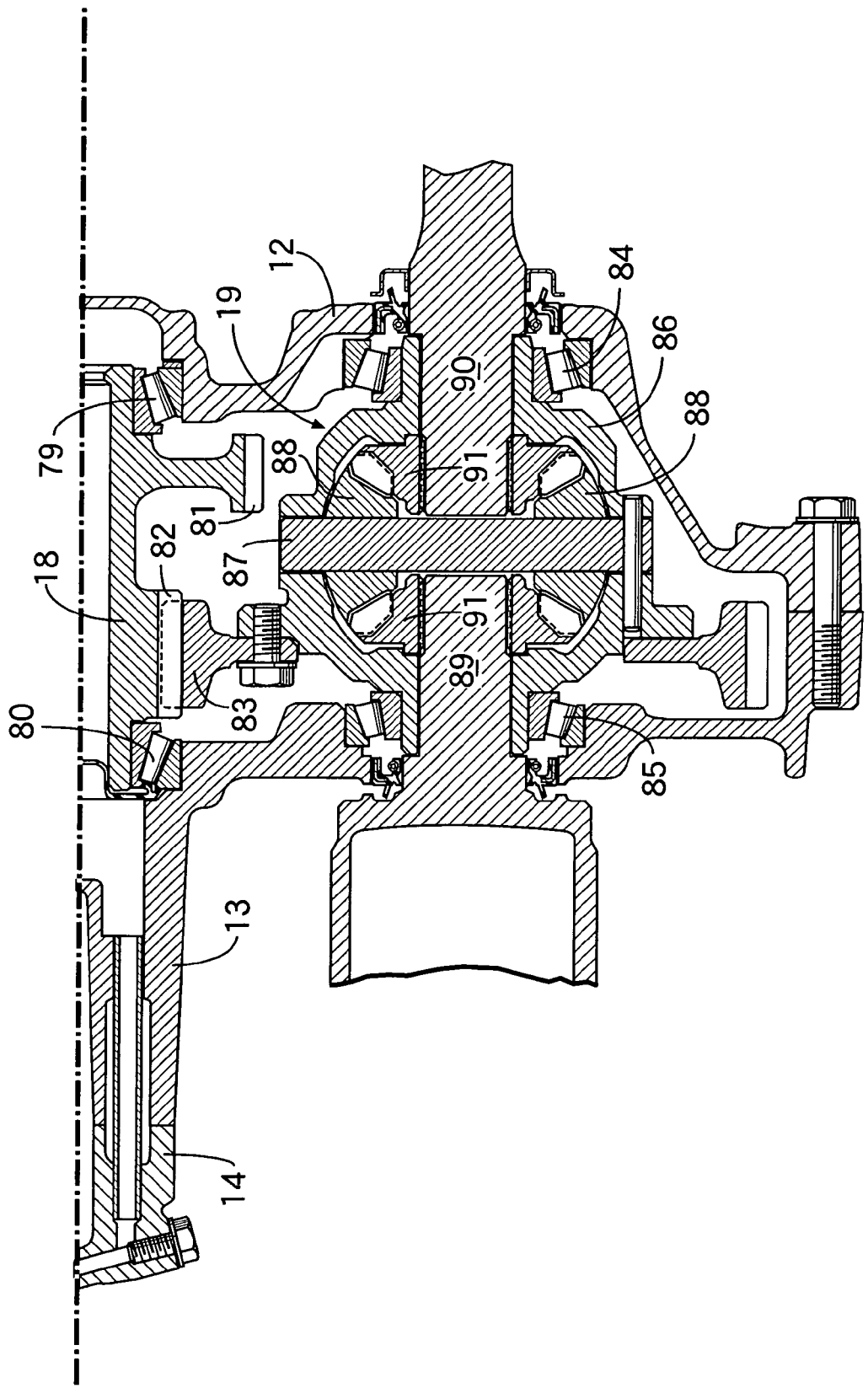
[FIG. 4]

As is clear from referring in addition to FIG. 2 to FIG. 4, the input shaft 16 is divided into an input shaft right half 16A on a side close to the engine E and an input shaft left half 16B on a side far from the engine E, and the right-hand end of the input shaft right half 16A and the left-hand end of the crankshaft 15 are joined together via a damper 21 having the function of a flywheel. A generator/motor M1 is formed from a stator 23 fixed to the right casing 12 via bolts 22 and a rotor 25 disposed so as to surround the outer periphery of the input shaft right half 16A and rotatably supported on the right casing 12 via a ball bearing 24, the stator 23 being provided with a plurality of coils 26, and the rotor 25 being provided with a plurality of permanent magnets 27.

A belt type continuously variable transmission 28 disposed in a space surrounded by the middle casing 13 and the left casing 14 includes a drive pulley 29 supported on the input shaft 16, a driven pulley 30 supported on the output shaft 17, and a metal belt 31 wound around the drive pulley 29 and the driven pulley 30. The drive pulley 29 is formed from a fixed pulley half 29a that is integral with the input shaft 16 and a movable pulley half 29b that can move toward and away from the fixed pulley half 29a, the movable pulley half 29b being capable of being urged toward the fixed pulley half 29a by means of hydraulic pressure supplied to a hydraulic chamber 32. Furthermore, the driven pulley 30 is formed from a fixed pulley half 30a that is integral with the output shaft 17 and a movable pulley half 30b that can move toward and away from the fixed pulley half 30a, the movable pulley half 30b being capable of being urged toward the fixed pulley half 30a by means of hydraulic pressure supplied to a hydraulic chamber 33.

By controlling the hydraulic pressure supplied to the two hydraulic chambers 32 and 33 so as to move the movable pulley half 29b of the drive pulley 29 away from the fixed pulley half 29a and at the same time move the movable pulley half 30b of the driven pulley 30 toward the fixed pulley half 30a, the gear ratio of the belt type continuously variable transmission 28 can therefore be changed to a LO side. Furthermore, by controlling the hydraulic pressure supplied to the two hydraulic chambers 32 and 33 so as to move the movable pulley half 29b of the drive pulley 29 toward the fixed pulley half 29a and at the same time move the movable pulley half 30b of the driven pulley 30 away from the fixed pulley half 30a, the gear ratio of the belt type continuously variable transmission 28 can be changed to an OD side.

A forward/reverse travel switching mechanism 41 is disposed between the left-hand end of the input shaft right half 16A and the right-hand end of the input shaft left half 16B. As is clear from FIG. 6, the forward/reverse travel switching mechanism 41 is formed from a planetary gear mechanism 42, a forward clutch 43, and a reverse brake 44. Engaging the forward clutch 43 provides a direct connection between the input shaft right half 16A and the input shaft left half 16B, and engaging the reverse brake 44 allows the rotation of the input shaft right half 16A to be reduced in speed and transmitted, as reverse rotation, to the input shaft left half 16B.

The planetary gear mechanism 42 includes a sun gear 45 joined to the input shaft left half 16B, a planetary carrier 47 rotatably supported on the sun gear 45 via a ball bearing 46, a ring gear 48 relatively rotatably disposed on an outer peripheral part of the planetary carrier 47, and a plurality of pinions 50 rotatably supported on pinion shafts 49 fixed to the planetary carrier 47 and meshing with both the sun gear 45 and the ring gear 48.

The forward clutch 43 includes a clutch outer 51 joined integrally to the input shaft right half 16A, a clutch inner 52 joined integrally to the sun gear 45, a plurality of frictional engagement members 53 that can provide a connection between the clutch outer 51 and the clutch inner 52, a clutch piston 55 driven by means of hydraulic pressure acting on a hydraulic chamber 54 so as to bring the frictional engagement members 53 into intimate contact with each other, and a return spring 56 urging the clutch piston 55 in a return direction. Therefore, engaging the forward clutch 43 allows the rotation of the input shaft right half 16A to be transmitted as it is to the input shaft left half 16B via the clutch outer 51, the frictional engagement members 53, the clutch inner 52, and the sun gear 45, thus making the vehicle travel forward.

The reverse brake 44 is formed from a plurality of frictional engagement members 57 that can provide a connection between the planetary carrier 47 and the middle casing 13, a clutch piston 59 driven by means of hydraulic pressure acting on a hydraulic chamber 58 so as to bring the frictional engagement members 57 into intimate contact with each other, and clutch springs 60 urging the clutch piston 59 in a return direction. Therefore, engaging the reverse brake 44 allows the planetary carrier 47 of the planetary gear mechanism 42 to be restrained by the middle casing 13 so that it cannot rotate. In this process, since the extremity of the clutch outer 51 of the forward clutch 43 is engaged with the ring gear 48 of the planetary gear mechanism 42 so that they can rotate as a unit, the rotation of the input shaft right half 16A is reduced in speed and transmitted, as reverse rotation, to the input shaft left half 16B via the clutch outer 54, the ring gear 48, the pinions 50, and the sun gear 45, thus making the vehicle travel in reverse.

The left-hand end of the input shaft right half 16A is supported on the right casing 12 via a ball bearing 61, and the right-hand end of the input shaft left half 16B is supported on the middle casing 13 via a ball bearing 62. Furthermore, numeral 64 in FIG. 2 is an oil pump, and numeral 65 is a valve block.

The right-hand end, a middle part, and the left-hand end of the output shaft 17 are respectively supported on the right casing 12, the middle casing 13, and the left casing 14 via ball bearings 71 and 72 and a roller bearing 73. A driven sprocket 74, a first reduction gear 75, and a parking gear 76 are fixed to a right-hand portion of the output shaft 17. A drive sprocket 77 fixed to the rotor 25 of the generator/motor M1 and the driven sprocket 74 are connected via an endless chain 78, and the driving force of the generator/motor M1 can therefore be transmitted directly to the output shaft 17 without going through the input shaft 16.

A second reduction gear 81 and a final drive gear 82 are formed integrally with the reduction shaft 18, which is supported on the right casing 12 and the middle casing 13 via a pair of roller bearings 79 and 80, the second reduction gear 81 meshing with the first reduction gear 75, and the final drive gear 82 meshing with a final driven gear 83 of the differential gear 19. The differential gear 19 includes a differential case 86 supported on the right casing 12 and the middle casing 13 via a pair of roller bearings 84 and 85, and the final driven gear 83 is fixed to the outer periphery of the differential case 86. A pair of differential pinions 88 are rotatably supported on a pinion shaft 87 fixed to the differential case 86, and a pair of differential side gears 91 fixed to opposing end parts of a left axle 89 and a right axle 90 running through the right casing 12, the middle casing 13, and the differential case 86 each mesh with the pair of differential pinions 88.

The operation of the first embodiment having the above-mentioned arrangement is now explained.

When the vehicle travels by means of the engine E, the driving force of the crankshaft 15 of the engine E is transmitted via the pathway: damper 21→input shaft right half 16A→forward/reverse travel switching mechanism 41→input shaft left half 16B→belt type continuously variable transmission 28→output shaft 17→first reduction gear 75→second reduction gear 81→reduction shaft 18→final drive gear 82→final driven gear 83→differential gear 19→left and right axles 89 and 90. In this process, if the forward clutch 43 of the forward/reverse travel switching mechanism 41 is engaged, the vehicle travels forward, if the reverse brake 44 is engaged, the vehicle travels in reverse, and by controlling the belt type continuously variable transmission 28 any gear ratio can be obtained.

When traveling by means of the engine E, rotation of the output shaft 17 is transmitted from the driven sprocket 74 via the endless chain 78 and the drive sprocket 77, thus allowing the rotor 25 of the generator/motor M1 to rotate idle. In this process, if the generator/motor M1 is driven forward, the driving force of the rotor 25 is transmitted from the drive sprocket 77 to the output shaft 17 via the endless chain 78 and the driven sprocket 74, and the generator/motor M1 can assist forward travel by means of the engine E. If the generator/motor M1 is driven in reverse, the generator/motor M1 can assist reverse travel by means of the engine E.

If the generator/motor M1 is driven forward in a state in which the forward clutch 43 and the reverse brake 44 are both disengaged, the driving force of the generator/motor M1 is transmitted via the pathway: drive sprocket 77→endless chain 78→driven sprocket 74→output shaft 17→first reduction gear 75→second reduction gear 81→reduction shaft 18→final drive gear 82→final driven gear 83→differential gear 19→left and right axles 89 and 90, thus allowing the vehicle to travel forward, and if the generator/motor M1 is driven in reverse, the vehicle can be made to travel in reverse.

When traveling by means of the generator/motor M1 as described above, since the driving force of the generator/motor M1 does not drag along the engine E, the input shaft right half 16A, and the forward/reverse travel switching mechanism 41, the so-called leg shaft drive becomes possible, and the load on the generator/motor M1 is reduced, thus contributing to a saving in power consumption. Furthermore, when the generator/motor M1 carries out regenerative braking accompanying deceleration of the vehicle, since the driving force transmitted back from a wheel to the generator/motor M1 does not drag along the engine E, the input shaft right half 16A, and the forward/reverse travel switching mechanism 41, the energy recovery efficiency can be enhanced.

As hereinbefore described, since the generator/motor M1 is disposed at a position sandwiched between the engine E and the transmission T on the axis L of the crankshaft 15 and the input shaft 16, that is, the same position as for the conventional sandwiched generator/motor type generator/motor, leg shaft drive becomes possible merely by a slight modification of the sandwiched generator/motor type transmission, specifically, merely by adding the drive sprocket 77, the driven sprocket 74, and the endless chain 78.

Moreover, since there is no need to add a generator/motor to the exterior of the transmission T, the axial dimension and the radial dimensions do not increase relative to the sandwiched generator/motor type transmission. Furthermore, since the generator/motor M1 is sandwiched between the engine E and the transmission T, which have a large heat capacity, ease of cooling thereof can readily be guaranteed.

Embodiment 2

Figure 7:
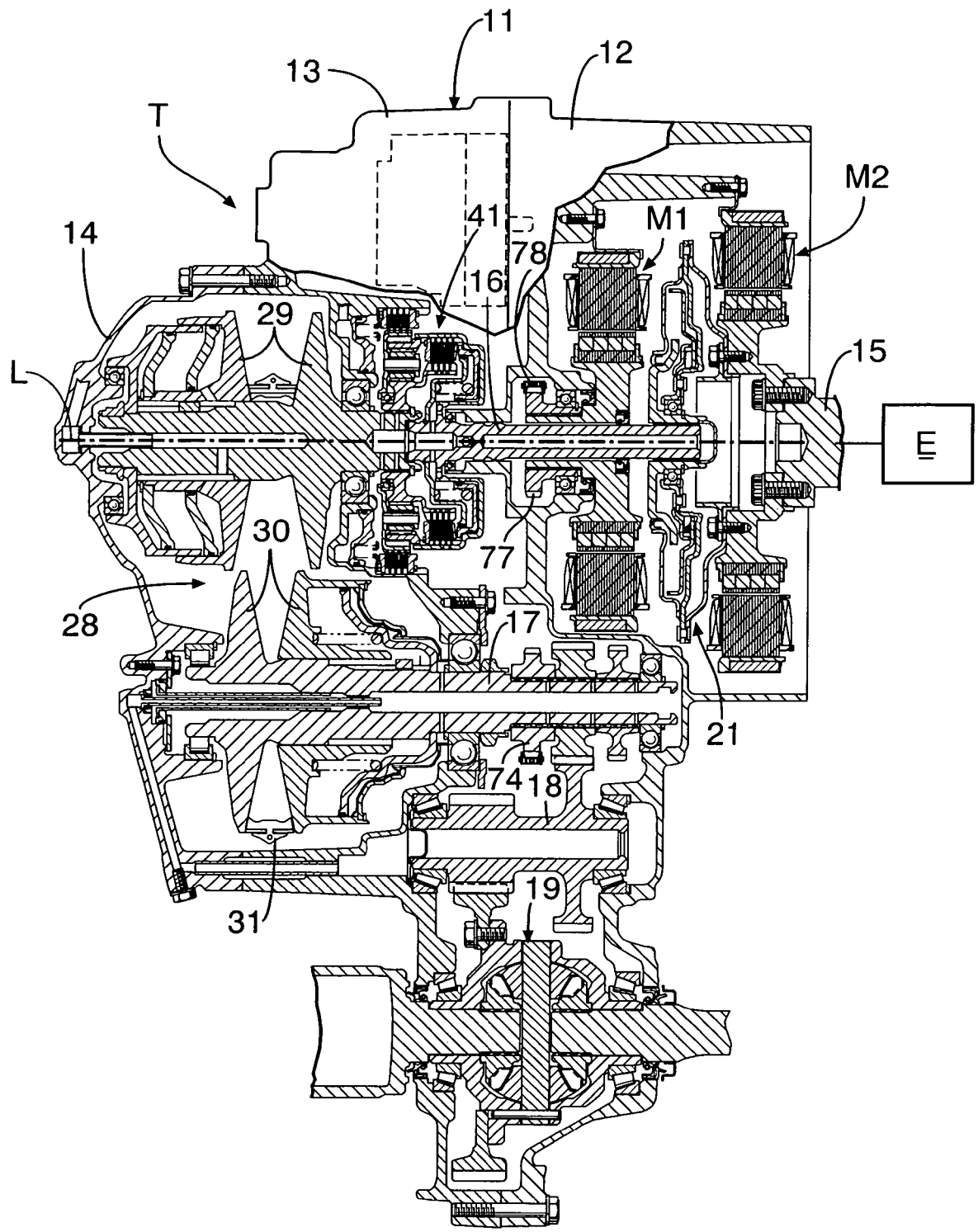
[FIG. 7]
Figure 8:
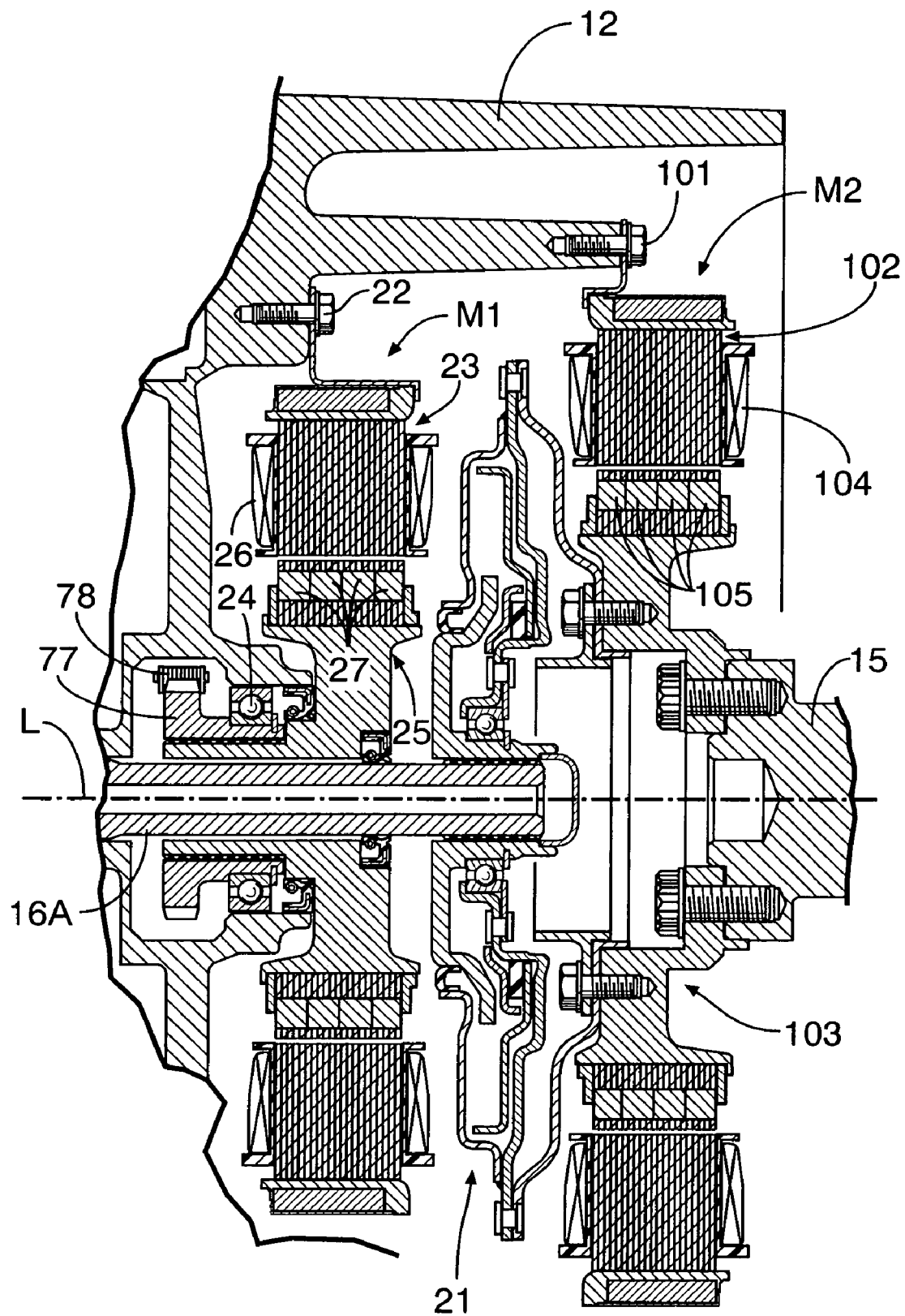
[FIG. 8]

FIG. 7 and FIG. 8 show a second embodiment of the present invention.

A transmission T of the second embodiment is different from the first embodiment in that it is equipped with a starter motor M2 for directly driving a crankshaft 15 so as to start an engine E, the remainder of the structure being the same as that of the first embodiment.

That is, the starter motor M2 is formed from a stator 102 fixed to a right casing 12 via bolts 101, and a rotor 103 fixed to a shaft end of the crankshaft 15, the stator 102 being provided with a plurality of coils 104, and the rotor 103 being provided with a plurality of permanent magnets 105.

Therefore, driving the starter motor M2 allows the rotor 103 to crank the crankshaft 15, thus starting the engine E. Furthermore, since the rotor 103 of the starter motor M2 has a sufficient weight, it is unnecessary to mount a mass on a damper 21 and it is possible to make the rotor 103 function as a flywheel.

Since a generator/motor M1 of the leg shaft drive system is not connected to the crankshaft 15 of the engine E, the engine E cannot be cranked by driving the generator/motor M1. However, in accordance with the second embodiment, the engine E can be cranked and started by driving the starter motor M2. Furthermore, when the engine E is running, power can be generated by driving the rotor 103 of the starter motor M2.

Since the starter motor M2 is provided at the shaft end of the crankshaft 15, it has little influence on the structure of the transmission T, and the same operational effects as those of the first embodiment described above can be achieved.

Figure 9:
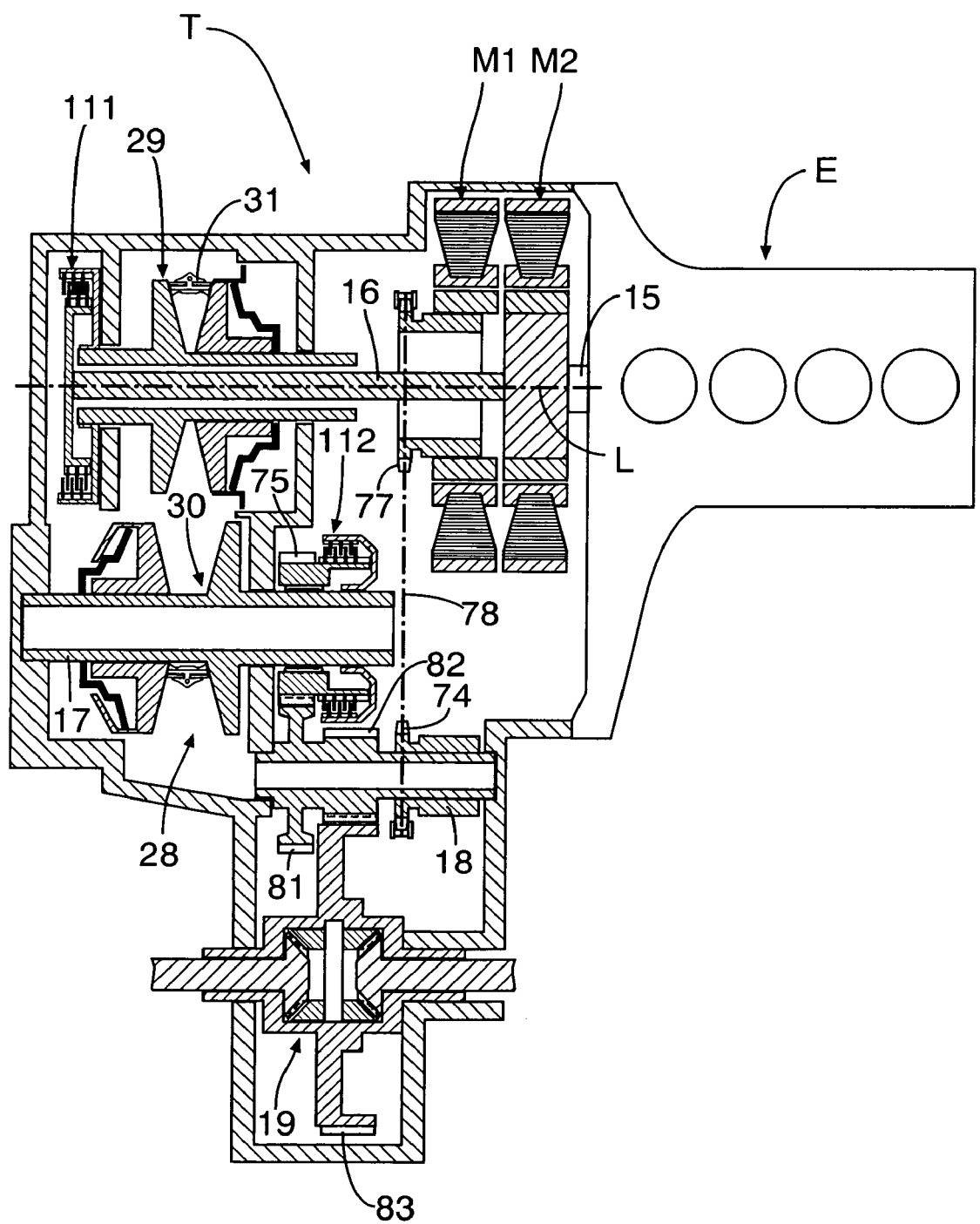
[FIG. 9]

A third embodiment of the present invention is now explained by reference to FIG. 9. The third embodiment is a modification of the second embodiment; components corresponding to the components of the second embodiment are denoted by the same reference numerals and symbols as those of the second embodiment, and duplication of the explanation is therefore omitted.

Embodiment 3

The third embodiment does not include the forward/reverse travel switching mechanism 41, but instead is provided with an input shaft clutch 111 and a starting clutch 112 on an input shaft 16 and an output shaft 17 respectively. The input shaft clutch 111 can couple the left-hand end of the input shaft 16 to a drive pulley 29 of a belt type continuously variable transmission 28. Furthermore, the starting clutch 112 can couple a first reduction gear 75 to the output shaft 17.

In accordance with the third embodiment, engaging both the input shaft clutch 111 and the starting clutch 112 enables forward travel by means of the engine E. However, since the forward/reverse travel switching mechanism 41 is not included, reversing by means of the engine E is not possible. On the other hand, driving a generator/motor M1 forward and in reverse enables forward travel and reverse travel by means of the leg shaft drive. In this process, by disengaging the starting clutch 112 the driving force of the generator/motor M2 when traveling or the driving force from a wheel during regenerative braking can be prevented from being transmitted to the output shaft 17 and the belt type continuously variable transmission 28, thus further reducing loss of driving force due to friction. Furthermore, when starting the engine E by means of the starter motor M2, or when the engine E is idling, by disengaging the input shaft clutch 111 dragging of the belt type continuously variable transmission 28 can be prevented, thus further reducing loss of driving force due to friction.

In addition, in accordance with the third embodiment, the same operational effects as those of the second embodiment can be achieved.

Figure 10:
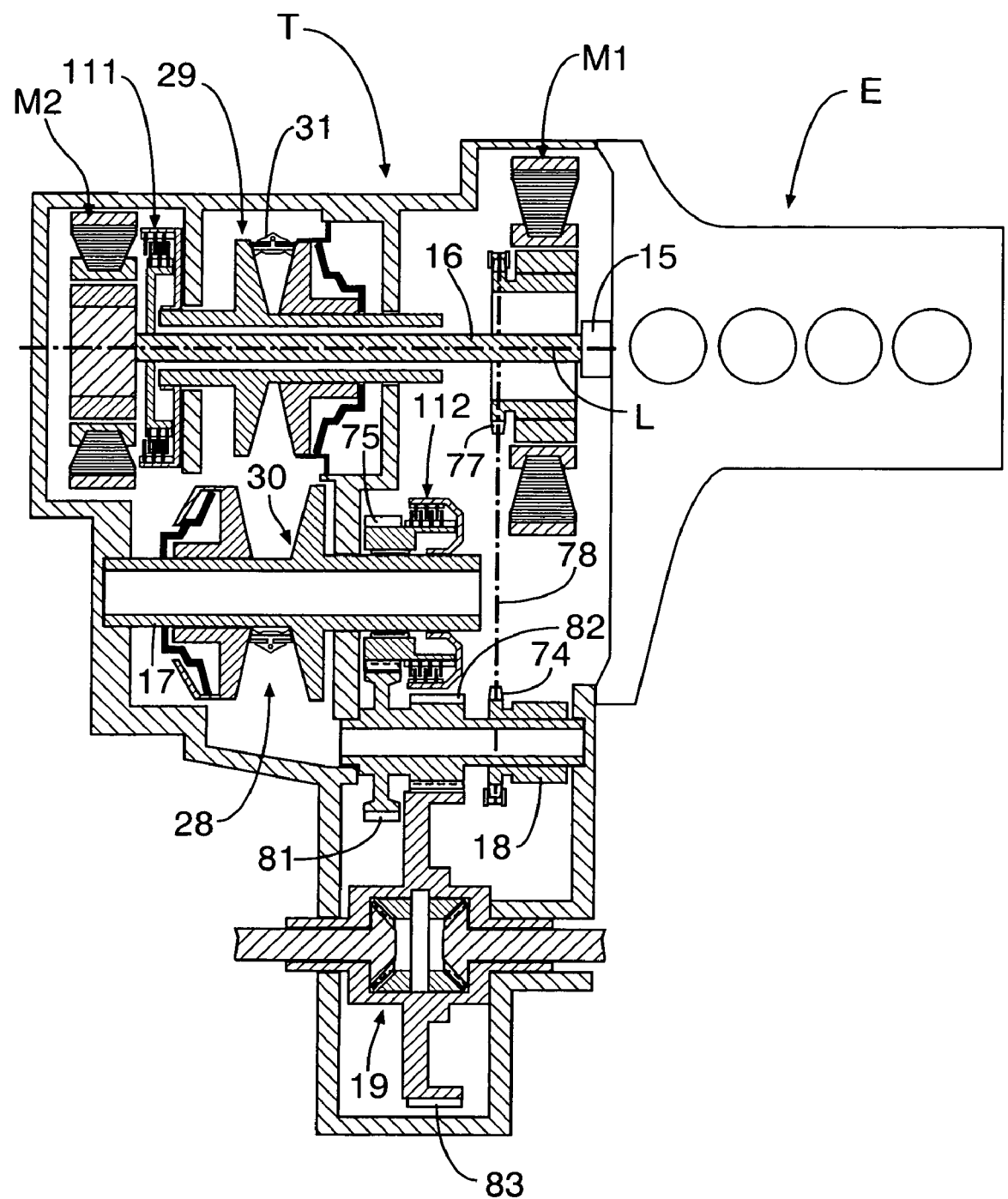
[FIG. 10]

A fourth embodiment of the present invention is now explained by reference to FIG. 10. The fourth embodiment is a modification of the third embodiment; components corresponding to the components of the third embodiment are denoted by the same reference numerals and symbols as those of the third embodiment, and duplication of the explanation is therefore omitted.

Embodiment 4

In the fourth embodiment, a starter motor M2, which is provided on the crankshaft 15 in the third embodiment, is moved to a shaft end of an input shaft 16 on a side opposite to an engine E; driving the starter motor M2 allows the engine E to be cranked via the input shaft 16, and driving the engine E allows power to be generated in the starter motor M2.

In accordance with the fourth embodiment; the same operational effects as those of the third embodiment can be achieved.

Although embodiments of the present invention are explained above, the present invention can be modified in a variety of ways as long as the modifications do not depart from the spirit and scope thereof.

For example, in the embodiments the driving force of the generator/motor M1 is transmitted to the output shaft 17 via the endless chain 78, but it may be transmitted via a gear train or an endless belt.

Furthermore, the transmission T of the embodiments is a continuously variable transmission having a belt type continuously variable transmission 28, but it may be any of a continuously variable transmission having any other structure, a stepped automatic transmission, or a manual transmission.

Moreover, in the embodiments the driving force of the generator/motor M1 is transmitted to the output shaft 17, but it may be transmitted to any position between the output shaft 17 and the differential gear 19 (for example, the reduction shaft 18).

Furthermore, in the second and third embodiments, the positional relationship between the generator/motor M1 and the starter motor M2 can be changed over.

Moreover, in the second and third embodiments, instead of joining the starter motor M2 to the crankshaft 15, it may be joined to the input shaft 16.

The invention claimed is:

1. A hybrid vehicle comprising:
   an engine having a crankshaft;
   a transmission that has an input shaft joined coaxially to the crankshaft, an output shaft disposed in parallel to the input shaft, a drive member provide on said input shaft, and a driven member provided on the output shaft, and is capable of changing the gear ratio between said drive member and said driven member;
   a generator/motor that is disposed so as to surround the outer periphery of an axis of the input shaft at a position sandwiched between the engine and the transmission; and
   power transmission means for transmitting the driving force of the generator/motor to any position of a power transmission pathway between the output shaft and a differential gear;
   the vehicle being capable of traveling by means of either one or both of the driving force of the engine and the driving force of the generator/motor,
   wherein the generator/motor is disposed coaxially with the axis, and
   wherein a starter motor is joined to an end part of the input shaft on a side opposite to the engine.

2. A hybrid vehicle comprising:

an engine having a crankshaft;

a transmission that has an input shaft joined coaxially to the crankshaft, an output shaft disposed in parallel to the input shaft, a drive member provide on said input shaft, and a driven member provided on the output shaft, and is capable of changing the gear ratio between said drive member and said driven member;

a generator/motor that is disposed so as to surround the outer periphery of an axis of the input shaft at a position sandwiched between the engine and the transmission; and power transmission means for transmitting the driving force of the generator/motor to any position of a power transmission pathway between the output shaft and a differential gear;

the vehicle being capable of traveling by means of either one or both of the driving force of the engine and the driving force of the generator/motor, wherein the generator/motor is disposed coaxially with the axis, and wherein a starter motor disposed so as to surround the outer periphery of the axis at a position sandwiched between the engine and the transmission is joined to the crankshaft or the input shaft.

3. A hybrid vehicle comprising:

an engine having a crankshaft;

a transmission that has an input shaft joined coaxially to the crankshaft, an output shaft disposed in parallel to the input shaft, a drive member provide on said input shaft, and a driven member provided on the output shaft, and is capable of changing the gear ratio between said drive member and said driven member;

a generator/motor that is disposed so as to surround the outer periphery of an axis of the input shaft at a position sandwiched between the engine and the transmission; and power transmission means for transmitting the driving force of the generator/motor to any position of a power transmission pathway between the output shaft and a differential gear;

the vehicle being capable of traveling by means of either one or both of the driving force of the engine and the driving force of the generator/motor, wherein the generator/motor is disposed coaxially with the axis.

* * * * *